United States Patent [19]

Derail

[11] 4,345,721
[45] Aug. 24, 1982

[54] APPARATUS FOR THE VARIABLE SPEED CONTROL OF CAMS IN TEXTILE MACHINES

[75] Inventor: Yves Derail, Roanne, France

[73] Assignee: ASA S.A., France

[21] Appl. No.: 128,918

[22] Filed: Mar. 10, 1980

[30] Foreign Application Priority Data

Mar. 16, 1979 [FR] France .............................. 79 07221

[51] Int. Cl.³ .......................................... B65H 54/38
[52] U.S. Cl. .............................. 242/18.1; 242/43 R; 318/306
[58] Field of Search ............ 242/18.1, 43 R, 43.1; 318/162–164, 301, 306, 302, 362, 369

[56] References Cited

U.S. PATENT DOCUMENTS

| | | | |
|---|---|---|---|
| 2,763,824 | 9/1956 | Bacheler | 242/18.1 X |
| 3,241,779 | 3/1966 | Bray et al. | 242/18.1 |
| 3,514,682 | 5/1970 | Corey | 242/18.1 X |
| 3,638,872 | 2/1972 | Jennings | 242/18.1 |
| 3,799,463 | 3/1974 | Peckinpaugh | 242/18.1 |
| 3,910,514 | 10/1975 | Hooper | 242/18.1 |
| 4,181,877 | 1/1980 | Gemp | 242/18.1 X |
| 4,221,344 | 9/1980 | Lohest | 242/18.1 |

Primary Examiner—Stanley N. Gilreath
Attorney, Agent, or Firm—Arnold, White & Durkee

[57] ABSTRACT

An apparatus is disclosed for the variable speed control of cams in a textile machine to provide for high speed winding of thread on spools which are controlled by the cams. A motor drives each cam. The speed of each motor is varied according to a predetermined cycle to produce a staggering of the thread on the spools from one layer to the other and to avoid the formation of bunches on the formed winding. The motors have a common induction supply which establishes the motors average speed and which operates to exchange the braking energy of the motors The driving energy applied to the motors is modulated in opposite phase in order to achieve variations around the average speed of the motors by inductively varying the flux of the motor windings.

10 Claims, 1 Drawing Figure

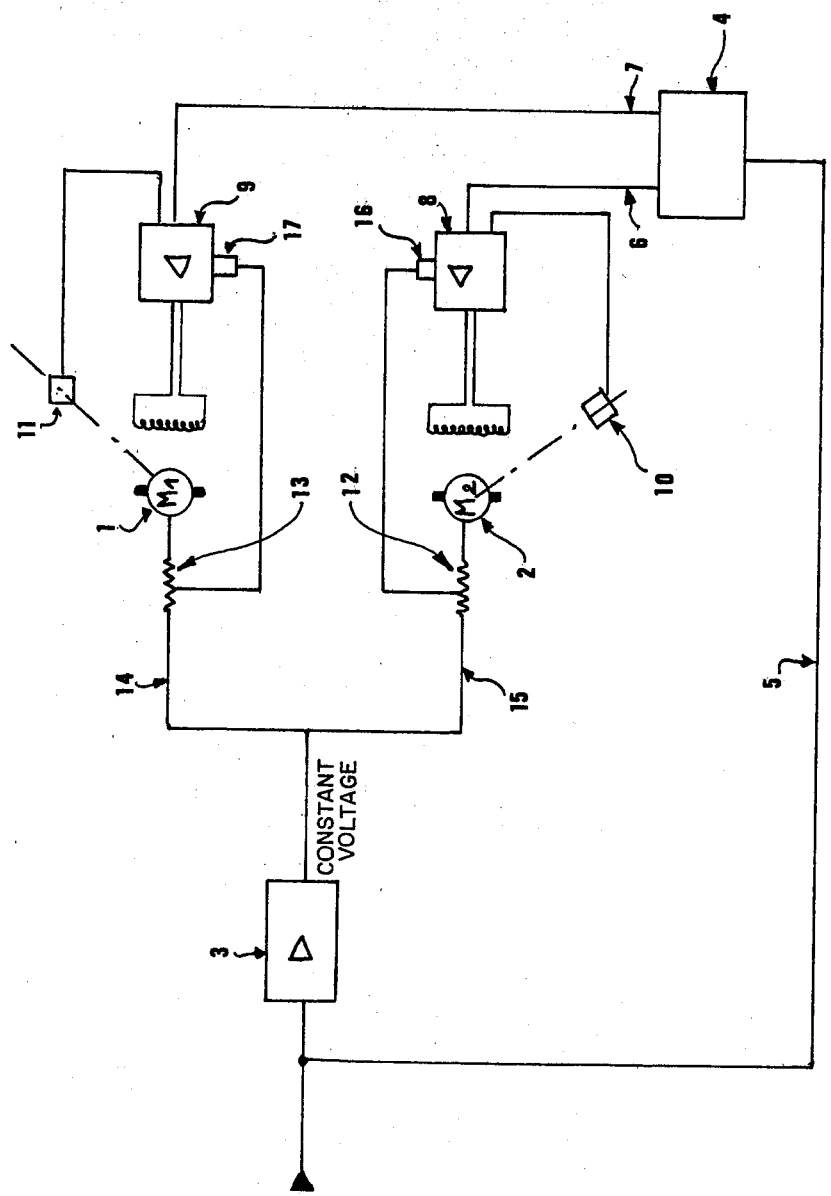

APPARATUS FOR THE VARIABLE SPEED CONTROL OF CAMS IN TEXTILE MACHINES

BACKGROUND OF THE INVENTION

This invention relates generally to a novel apparatus providing variable speed control of cams in textile machines to prevent bunching of threads, especially during relatively high speed winding. More particularly, this invention concerns an apparatus providing for the control of cams in a textile machine by a motor in mechanical communication with the cams. The motors which control the cams vary, according to a predetermined cycle, the speed of the textile machine cams. Preferably, two motors are arranged with a common induction source which fixes the motors' average speeds and exchanges the motors' braking energy. The speed variations around the average speed of the motors is modulated in phase opposition by the variation in flux in each motor which thereby produces a staggering of the thread spools from one layer to the other and avoids formation of bunches on the formed winding.

The apparatus has utility in relatively high speed textile machines for texturation by false torsion.

It is well known in the art that in the winding of threads upon spools of textile machines, it is imperative that the speed of the conventional moving devices which distribute the thread on the spools be varied in order to avoid bunching of the threads. Bunching is a problem recognized in the art involving the avoidance of having the thread spirals superimposed one on top of the other.

In the past, mechanical mixers or variators have been used which modulate the average speed of rotation for the cam feed devices with periodic symmetric signals (for example, a triangle signal). Accelerating and periodically braking the speed of the feed devices which distribute the threads is necessary.

Prior art arrangements have been unsatisfactory in relatively high speed textile machines. Modern textile machines are capable of winding speeds which are appreciably faster than may be satisfactorily accomodated by typical prior art devices. The unsatisfactory prior art devices are particularly lacking in the case of, for example, textile machines for the texturation by false torsion, where in recent years, such machines have been capable of winding speeds of 400 meters per minute to 1,000 meters per minute.

While prior art arrangements have exhibited a degree of utility in older and slower textile machines, room for significant improvement remains.

SUMMARY OF A PREFERRED EMBODIMENT OF THE INVENTION

Recognizing the need for an improved apparatus for controlling speed variations of textile machine cams in high speed textile machines to avoid bunching, it is, therefore, a general feature of the present invention to provide a novel apparatus which minimizes or reduces the problems of the type previously noted.

The present invention deals with an improvement in the variable speed control of textile machine cams, and more specifically, cams for machines which have two symmetric sides, each with the same number of positions.

Generally, the invention is concerned with an improved apparatus which varies, according to a predetermined cycle, the speed of the feed motors of the cam of a textile machine which preferably has two symmetric sides. More particularly, in a preferred embodiment, each side of the textile machine may be controlled by one motor. Two motors are arranged with a common induction source which fixes the two motors' average speeds and exchanges the motors' braking energy. The speed variations around the average speed of the motors is modulated in phase opposition by the variation in flux in each motor, thereby producing a staggering of the thread spools from one layer to the other and avoiding the formation of bunches on the formed thread winding.

Examples of the more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto.

BRIEF DESCRIPTION OF THE DRAWINGS

The single FIGURE of the drawing is a schematic diagram showing the variable speed control apparatus.

DETAILED DESCRIPTION OF A PREFERRED EMBODIMENT OF THE INVENTION

Referring to FIG. 1, a preferred embodiment of the invention comprises a first motor 1 and a second motor 2. The motors 1 and 2 may be conventional motors commonly known in the art. Each of the motors 1 and 2 is in mechanical communication with and controls conventional cams (not shown) preferably located on one side of a conventional textile machine (not shown) in a conventional manner. The motors 1 and 2 preferably use continuous current, of the conventional separated excitation type. A common induction source circuit supplying energy to the motors 1 and 2 is completed by a triphase variator 3 interposed between the source 5 and the motors 1 and 2. The triphase variator 3 furnishes a constant voltage to the common induction circuit illustrated in FIG. 1 and functions to control the average speed of the motors 1 and 2. Thus, the average speed of the motors 1 and 2 may be effectively established by the triphase variator 3, in cooperation with the source 5.

In order to inhibit bunching of the thread as it is wound upon the spools of the textile machine, it is desirable to vary the average speed of the cam feed devices by varying the average speed of the motors 1 and 2.

In a preferred embodiment, this is essentially accomplished by providing a modulation signal to the motors 1 and 2. The motors 1 and 2 are modulated in phase opposition, to achieve speed variations by flux variation in each of the motors 1 and 2. In a preferred embodiment, flux variations are obtained by a generator 4. Preferably, the generator 4 supplies sawtooth voltages which are applied to a first induction variator 9 and a second induction variator 8. Preferably, the same constant voltage that is supplied to the triphase variator 3 is also supplied to the generator 4. Thus, the generator 4 is connected to the source 5, as shown in FIG. 1. Those skilled in the art will appreciate that a voltage generator 4 may be used which generates a sinusoidal signal instead of a sawtooth voltage. Generally, any generator 4 or equivalent element which produces symmetric signals may be used with some utility as the generator 4.

The generator 4 preferably has a first output 7 and a second output 6. As shown in FIG. 1, the second output 6 is connected to the second induction variator 8. The first output 7 is connected to the first induction variator 9. Through the first and second induction variators 9 and 8, the first and second outputs 7 and 6 respectively supply a voltage to the motors 2 and 1 which is modulated in phase opposition by the intermediary of the first and second induction variators 9 and 8, respectively. It will be understood by those skilled in the art that the variable voltage produced at the output of the induction variator 8 will be comparable to the given voltage, i.e., the input voltage applied to the second induction variator 8 by the second output 6 of the generator 4. The voltage furnished to the second motor 2 through the intermediary of the second induction variator 8 will be produced by a conventional second dynamotachymetric 10 which will control, by flux variation, the speed of the second motor 2 in response to the reference voltages applied to the second induction variator 8. Similarly, the speed of the first motor 1 will be modulated and varied by a similar first dynamotachymetric 11, which dictates by flux variation, the speed of the first motor 1 in response to the reference voltages supplied by the first induction variator 9. The first induction variator 9 supplies a voltage which is modulated in phase opposition by the first induction variator 9 and which is applied to the first dynamotachymetric 11.

In a preferred embodiment, a first shunt 13 is connected between the first induction variator 9 and a first output 14 of the triphase variator 3. As described above, the triphase variator 3 supplies an average signal from the source 5 to the first motor 1. The first shunt 13 operates to produce a counter reaction which improves the stability of the apparatus.

Similarly, a second shunt 12 is connected between the second induction variator 8 and a second output 15 of the variator 3 in order to similarly improve the stability of the apparatus. Preferably, the first and second shunts 13 and 12 are galvanically isolated from the first and second induction variators 9 and 8 by a first and second intermediary coupler 17 and 16, respectively, as shown in FIG. 1. The first and second outputs are preferably connected at a common point upon the triphase variator 3, as illustrated.

The apparatus of FIG. 1 may be better understood in connection with a description of the operation of the apparatus. A generally continuously constant voltage or signal provided by the source 5 may be thought of as an average value which is simultaneously registered on or supplied to the generator 4 and the triphase variator 3. The triphase variator 3 furnishes to the induction circuit of the first and second motors 1 and 2, a constant voltage which thus controls the average speed of the motors, as shown in FIG. 1.

The source 5 is also connected to the generator 4. The generator 4 sends out two outputs or signals for variable speed control. Preferably, the first output 7 and the second output 6 of the generator 4 have outputs comprising sawtooth voltages or signals which are supplied to the first and second induction variators 9 and 8. As shown in FIG. 1, the first output 7 supplies a signal to the first induction variator 9. Similarly, the second output 6 supplies a signal to the second induction variator 8. The two signals or voltages produced by the generator 4 at the first and second outputs 7 and 6, have their variations in opposition phase and are comparable to the voltages given by or produced by a first and second dynamotachymetric 11 and 10 which are in the first and second induction variators or monophase variators 9 and 8, respectively, so as to obtain a flux variation and consequently a motor speed variation which is similar to or which follows the reference voltages.

As shown in FIG. 1, the first dynamotachymetric 11 is connected to the first induction variator 9 and operates in connection with the first motor 1. Similarly, the second dynamotachymetric 10 is connected to the second induction variator 8 and operates in connection with the second motor 2.

The stability of the apparatus is improved by the use of the first and second shunts 13 and 12 on the induction current so as to obtain a counter reaction loop, in a preferred embodiment of the invention.

In a preferred embodiment, the use of a first and second intermediary coupler or galvanic isolation 17 and 16 between the first and second shunt 13 and 12 and the first and second induction variator 9 and 8, respectively, has given satisfactory results. In practice, this isolation may be accomplished, for example, by the utilization of a coupler such as a commercially available galvanic isolation device. The galvanic isolation card "A06" manufactured by the Telemechanic Society (Societe Telemecanique) has given satisfactory results.

In an embodiment of the invention for use in connection with a textile machine which achieves texturation by false torsion of the FTF 0.90 type of the Society A.R.C.T., and which has 216 positions, the following elements may be used which have the following characteristics:

The variator 3 may be a triphase variator, 90 amperes, at 380 volts;

The motors 1 and 2 may be continuous current motors of the separated excitation type of 17 killowatts, 420 volts for induction 190 volts at the inductor;

The monophase variators 8 and 9 may be rated at 16 amperes, 380 volts;

The voltage generator 4 may be a specific generator which is derived from a triangular oscillator whose amplitude and whose oscillation are always plus or minus 7.5% of the average reference voltage. This oscillation is added or subtracted from the average value in order to give two duties in opposition phase;

The shunts 12 and 13 may be resistances of 5 milliohms;

The dynamotachymetrics 10 and 11 may be placed on the axes of the two motors 1 and 2 and electrically tied to the two monophase variators 8 and 9; these dynamos should preferably produce a voltage of 60 millivolts per turn per minute.

In practice, an embodiment of the invention constructed in accordance with the above has made it possible to obtain a maximal speed of the motors on the order of 2,000 turns per minute, which speed may vary by 7.5% during a period of 0.8 seconds.

SUMMARY OF ADVANTAGES OF THE INVENTION

It will be appreciated that in constructing an improved apparatus for the variable speed control of cams in textile machines according to the present invention, certain significant advantages are provided.

Among other advantages, the linearity of the disclosed embodiment of the invention is good. The material which is used may be completely standard in order to achieve economies of construction in operation. The response time of the invention is completely satisfactory.

In addition, the cost of constructing an embodiment of the invention is relatively low, making the invention economical and practical. The invention may be effective in reducing the problem of thread bunching in high speed textile machines, and thus permit more efficient operation of such machines.

Although the present invention has been described in conjunction with a specific preferred embodiment, many alternatives, modifications and variations may be apparent to those skilled in the art in light of the foregoing disclosure. Accordingly, the above description is to be construed as illustrative only and is the purpose of teaching those skilled in the art the manner of carrying out the invention. The invention is, in general, applicable to all textile machines with two motors with an equivalent charge.

It is intended that all such alternatives, modifications and variations which fall within the spirit and scope of the invention as defined in the appended claims be embraced thereby.

What is claimed is:

1. In an apparatus for the control of speed variation of textile machine cams where a textile machine has two symmetric sides and each side has cams which provide for a back and forth movement to guide the winding of the threads upon spools, the cams of each side being controlled by a motor which is mechanically linked to the cams, the improvement comprising:
   a common induction source connected to the motors on each side of the textile machine, said common induction source being adapted to establish the two motors' average speed and to exchange the two motors' braking energy, the variations around the average speed of the two motors being modulated in phase opposition by a flux variation in each motor thereby producing a staggering of the thread wound upon the spools from one layer to the other end and thereby avoiding bunching on the formed winding.

2. The apparatus according to claim 1, wherein:
   the motors comprise continuous current motors of a separated excitation type;
   the common induction source of the two motors comprises:
     a triphase variator connected to each motor which furnishes the motors with a driving current having a constant voltage component to establish the average speed of the motors;
     a source of electrical energy having a generally constant voltage, the source of electrical energy being connected to the triphase variator;
     a generator for producing a generally sawtooth voltage, the generator being connected to the source of electrical energy which furnishes to the generator a constant voltage which is generally identical to that which is furnished to the triphase variator, the generator having two outlets;
   two inductor variators each being connected to one of the outlets of the generator, the inductor variators having variable voltages which are modulated in phase opposition in response to reference signals at the outlets of the generator, in order to achieve flux variation a motor speed for each motor in response to the reference signals at the outlets of the generator; and,
   the common induction source further comprising a shunt connected between each of the two induction variators and the source of electrical energy, the shunts providing a counter reaction loop to improve stability, the shunts being galvanically isolated from the induction variators by intermediary couplers.

3. In a textile machine having a first spool for winding thread, a first cam for controlling the positional placement of thread upon the first spool, and a first motor in mechanical communication with the first cam and adapted to drive the first cam, the textile machine having a second spool for winding thread, a second cam for controlling the positional placement of thread upon the second spool, and a second motor in mechanical communication with the second cam and adapted to drive the second cam, the improvement comprising:
   a source of electrical energy;
   a triphase variator, said triphase variator having an input connected to said source of electrical energy, said triphase variator having an output connected to the first and second motors and adapted to fix the average speed of the motors, said triphase variator being adapted to permit the exchange of braking energy between the motors; and,
   a generator connected to said source of electrical energy, said generator having a first variable output and a second variable output, said first variable output being connected to the first motor, said second variable output being connected to the second motor, said variable outputs being adapted to vary the speed of the motors according to a predetermined cycle, thereby varying the positional placement of thread upon the first and second spools to inhibit bunching of the thread.

4. The apparatus of claim 3, further comprising:
   a first induction variator, said first induction variator being connected between said first variable output and the first motor;
   a second induction variator, said second induction variator being connected between said second variable output and the second motor; and,
   said first and second induction variators being adapted to supply variable signals modulated in phase opposition to the first and second motors to vary the speed of the first and second motors.

5. The apparatus of claim 4, further comprising:
   a first shunt, said first shunt being connected between the output of said triphase variator and said first induction variator;
   a second shunt, said second shunt being connected between the output of said triphase variator and said second induction variator; and,
   said first and second shunts being adapted to enhance stability of operation of the motors.

6. The apparatus of claim 5, further comprising:
   a first intermediary coupler, said first intermediary coupler being interposed between said first induction variator and said first shunt, said first intermediary coupler being adapted to provide galvanic isolation in cooperation with said first induction variator and said first shunt; and,
   a second intermediary coupler, said second intermediary coupler being interposed between said second induction variator and said second shunt, said second intermediary coupler being adapted to provide galvanic isolation in cooperation with said second induction variator and said second shunt.

7. The apparatus of claim 6, further comprising:
- a first dynamotachymetric, said first dynamotachymetric being connected to said first induction variator; and,
- a second dynamotachymetric, said second dynamotachymetric being connected to said second induction variator.

8. An apparatus for the variable speed control of cams in a textile machine to provide for high speed winding of thread on spools, comprising:
- a textile machine having a first cam for controlling the winding of thread upon a first spool, the first cam being controlled by a first motor, the textile machine having a second cam for controlling the winding of thread upon a second spool, the second cam being controlled by a second motor;
- a triphase variator connected to the first and second motors, the triphase variator being adapted to establish the motors' average speed by supplying a control signal to the motors having a constant voltage component;
- a generator for supplying a first and second modulation signal to be used to vary the motors' average speed, the generator having a first output and a second output, the first modulation signal at the first output being in phase opposition to the second modulation signal at the second output;
- a first induction variator connected to the first output of the generator, the first induction variator being responsive to the first modulation signal to supply a control signal to the first motor having a variable voltage component;
- a first dynamotachymetric connected to the first induction variator and magnetically coupled to the first motor, the first dynamotachymetric being adapted to produce a flux variation responsive to the first modulation signal to vary the speed of the first motor to inhibit bunching of thread wound upon the first spool;
- a second induction variator connected to the second output of the generator, the second induction variator being responsive to the second modulation signal to supply a control signal to the second motor having a variable voltage component; and,
- a second dynamotachymetric connected to the second induction variator and magnetically coupled to the second motor, the second dynamotachymetric being adapted to produce a flux variation responsive to the second modulation signal to vary the speed of the second motor to inhibit bunching of thread wound upon the second spool.

9. The apparatus of claim 8, further comprising:
- a first intermediary coupler connected between the first induction variator and a first shunt interposed between the first motor and the triphase variator, the first intermediary coupler providing galvanic isolation between the first induction variator and the first shunt;
- a second intermediary coupler connected between the second induction variator and a second shunt interposed between the second motor and the triphase variator, the second intermediary coupler providing galvanic isolation between the second induction variator and the second shunt; and,
- the first and second intermediary coupler and the first and second shunts cooperating to form a counter reaction loop to improve stability.

10. The apparatus of claim 9, wherein the first and second motor are continuous current motors of the separated excitation type.

* * * * *

UNITED STATES PATENT AND TRADEMARK OFFICE
CERTIFICATE OF CORRECTION

PATENT NO. : 4,345,721
DATED : August 24, 1982
INVENTOR(S) : Yves Derail

It is certified that error appears in the above—identified patent and that said Letters Patent is hereby corrected as shown below:

In the abstract, line 11, "motors" should be -- motors. --.

Column 5, line 66, before "flux", insert -- by --.

Column 8, line 34, "motor" should be -- motors --.

Signed and Sealed this

Fifteenth Day of February 1983

[SEAL]

Attest:

Attesting Officer

GERALD J. MOSSINGHOFF

Commissioner of Patents and Trademarks